(12) United States Patent
Kobayashi et al.

(10) Patent No.: US 8,999,511 B2
(45) Date of Patent: Apr. 7, 2015

(54) CUBIC BORON NITRIDE SINTERED BODY TOOL

(75) Inventors: Yasunori Kobayashi, Itami (JP); Satoru Kukino, Itami (JP); Makoto Setoyama, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 158 days.

(21) Appl. No.: 13/805,606

(22) PCT Filed: Apr. 3, 2012

(86) PCT No.: PCT/JP2012/059077
§ 371 (c)(1),
(2), (4) Date: Dec. 19, 2012

(87) PCT Pub. No.: WO2013/150610
PCT Pub. Date: Oct. 10, 2013

(65) Prior Publication Data
US 2013/0260165 A1    Oct. 3, 2013

(51) Int. Cl.
*B32B 7/12* (2006.01)
*B32B 15/04* (2006.01)
*B32B 9/00* (2006.01)

(52) U.S. Cl.
CPC . *B32B 7/12* (2013.01); *B32B 15/04* (2013.01); *B32B 9/005* (2013.01); *B32B 15/043* (2013.01)

(58) Field of Classification Search
CPC ........ B32B 15/04; B32B 15/043; B32B 7/12; B32B 9/005
USPC ............ 51/307, 309; 428/457, 698, 699, 701, 428/702, 704, 469, 697; 501/96.4
See application file for complete search history.

(56) References Cited

U.S. PATENT DOCUMENTS

| | | | | |
|---|---|---|---|---|
| 5,200,372 A * | 4/1993 | Kuroyama et al. | .......... | 501/96.4 |
| 6,071,841 A | 6/2000 | Sumiya | | |
| 6,155,755 A | 12/2000 | Kanada et al. | | |
| 6,737,178 B2 * | 5/2004 | Ota et al. | ....................... | 428/698 |

(Continued)

FOREIGN PATENT DOCUMENTS

| | | |
|---|---|---|
| CN | 101014435 A | 8/2007 |
| CN | 101263236 A | 9/2008 |

(Continued)

OTHER PUBLICATIONS

Notice of Grounds of Rejection in Japanese Patent Application No. 2010-243953, dated Feb. 4, 2014.

(Continued)

*Primary Examiner* — Archene Turner
(74) *Attorney, Agent, or Firm* — Venable LLP; Steven J. Schwarz; Tamatane J. Aga (57) ABSTRACT

A cBN sintered body tool has the following feature. In at least one cross sectional surface of the cBN sintered body tool taken along a plane perpendicular to a joining surface having the largest area in joining surfaces between the cBN sintered body and the joining layer, a point C and a point D are assumed to represent points away by ¼ of the length of a line segment connecting a point A and a point B shown in a figure. A value obtained when an area of a region surrounded by a line segment connecting the point C and the point D, the first cBN particle, the second cBN particle, and the binder phase is divided by the length of the line segment connecting the point A and point B to each other is 0.14-0.6 μm.

6 Claims, 2 Drawing Sheets

(56) References Cited

U.S. PATENT DOCUMENTS

| | | | |
|---|---|---|---|
| 7,081,424 B2 * | 7/2006 | Okamura et al. | 51/307 |
| 7,524,785 B2 * | 4/2009 | Matsukawa et al. | 51/307 |
| 7,703,710 B2 * | 4/2010 | Ihara et al. | 51/307 |
| 7,758,976 B2 * | 7/2010 | Kukino et al. | 428/698 |
| 7,771,847 B2 * | 8/2010 | Kukino et al. | 51/307 |
| 8,124,553 B2 * | 2/2012 | Okamura et al. | 501/96.4 |
| 8,757,472 B2 * | 6/2014 | Egan | 228/122.1 |
| 2005/0143252 A1 | 6/2005 | Okamura et al. | |
| 2007/0110607 A1 | 5/2007 | Iwasaki et al. | |
| 2008/0214383 A1 | 9/2008 | Matsukawa et al. | |
| 2008/0254282 A1 | 10/2008 | Kukino et al. | |

FOREIGN PATENT DOCUMENTS

| | | | |
|---|---|---|---|
| DE | 4304104 A1 | 9/1993 | |
| EP | 1757388 A1 | 2/2007 | |
| JP | 59-078978 | * | 5/1984 |
| JP | 6-206105 A | 7/1994 | |
| JP | 07-018415 A | 1/1995 | |
| JP | 7-291732 A | 11/1995 | |
| JP | 10-158065 A | 6/1998 | |
| JP | 11-188510 A | 7/1999 | |
| JP | 11-320218 A | 11/1999 | |
| JP | 2000-326111 A | 11/2000 | |
| JP | 2005-187260 A | 7/2005 | |
| JP | 2006-346777 A | 12/2006 | |
| JP | 2007-021639 A | 2/2007 | |
| JP | 2007-276079 A | 10/2007 | |
| JP | 2010-089223 A | 4/2010 | |
| JP | 2011-527979 A | 11/2011 | |
| WO | WO-2005/066381 A1 | 7/2005 | |
| WO | WO-2007/039955 A1 | 4/2007 | |
| WO | WO-2009/010934 A2 | 1/2009 | |

OTHER PUBLICATIONS

Notice of Grounds of Rejection in Japanese Patent Application No. 2010-243953, dated Oct. 29, 2013.

Notification of the First Office Action issued in Application No. 201280002309.3 dated Dec. 31, 2014.

* cited by examiner

CUBIC BORON NITRIDE SINTERED BODY TOOL

TECHNICAL FIELD

The present invention relates to a cBN sintered body tool configured to have a cBN sintered body containing cubic boron nitride (hereinafter, also referred to as "cBN") particles and a binder phase and directly joined to a tool base material via a joining layer.

BACKGROUND ART

A cBN sintered body refers to a body obtained by binding cBN particles to one another with a binder phase mainly composed of TiN, TiC, Co, and Al. Each of the cBN particles is a material having hardness and thermal conductivity next to diamond and having fracture toughness superior to a ceramics material. Therefore, a cBN sintered body containing such cBN particles at a high content is excellent in characteristics such as plastic deformation resistance, toughness, strength, and defect resistance.

A cBN sintered body tool employing the cBN sintered body having such characteristics is excellent in that it is better in chemical stability, lower in affinity with iron, longer in life, and higher in efficiency in working because of its high hardness as a material, than a tool material such as a conventional cemented carbide tool and the like, and it is highly evaluated. Such a cBN sintered body tool of high performance has replaced a conventionally used tool in such applications as cutting of Ni-based and iron-based high-hardness difficult-to-cut materials, applications of plastic working of a punching tool for cold forging, and the like.

Here, "cutting" refers to machining of an article into desired dimension and shape while chips are generated. "Plastic working" refers to application of force to a workpiece to deform the same and formation of the workpiece into a product having prescribed shape and dimension. It should be noted that plastic working is different from cutting in that no chips are generated.

Since the cBN sintered body tool has excellent characteristics as described above, it is advantageous in that sudden defect is less likely in any application of cutting and plastic working and it is extremely suitably employed.

Regarding a conventional cBN sintered body tool, for example, each of PTL 1 and PTL 2 discloses a technique of improving hardness and toughness of the cBN sintered body by reducing inclusion of impurities as much as possible assuming that a metal such as Al, oxygen, and the like contained in the cBN sintered body are the impurities, i.e., by increasing a mixing ratio of cBN particles (Japanese Patent Laying-Open No. 07-291732 (PTL 1) and Japanese Patent Laying-Open No. 10-158065 (PTL 2)).

In addition, a cBN sintered body tool has been considered and commonly believed to be high in performance if it has high hardness and high toughness as well as high thermal conductivity. In accordance with this common belief, Japanese Patent Laying-Open No. 2005-187260 (PTL 3) and International Publication No. WO 2005/066381 (PTL 4) each have proposed a cBN sintered body tool in which thermal conductivity, in addition to hardness and toughness, is improved by use of a cBN sintered body containing high-purity cBN particles, which have high thermal conductivity, at a high concentration. Defect of such a cBN sintered body tool is less likely both in a case of plastic working of a material of low ductility and in a case of cutting of a material having high hardness, advantageously.

According to each of the techniques disclosed in PTLs 1-4 described above, the hardness, the toughness, the thermal conductivity, and the like of the cBN sintered body can be improved in performance, which tends to result in less defect while improving wear resistance of the cBN sintered body.

Meanwhile, the cBN sintered body tool is generally structured to have the cBN sintered body joined to a tool base material via a joining layer such that the cBN sintered body is located in its surface for working on a workpiece. The improvement of the performance of the cBN sintered body as in each of PTLs 1-4 raises a new problem other than the performance of the cBN sintered body as follows: insufficient adhesion between the cBN sintered body and the tool base material causes the cBN sintered body to fall from the tool base material during working, with the result that the tool becomes unusable.

To address this, in each of Japanese Patent Laying-Open No. 2007-276079 (PTL 5) and Japanese Patent Laying-Open No. 11-320218 (PTL 6), it is considered to revise the composition of the joining layer in order to improve the adhesion between the cBN sintered body and the tool base material. Specifically, in PTL 5, for the composition of the joining layer, not less than 10 mass % and not more than 30 mass % of Cu, not less than 2 mass % and not more than 10 mass % of Ti, and not less than 1 mass % and not more than 4 mass % of Ni are employed with a remainder thereof containing Ag and an inevitable impurity, for example. The use of such a material leads to improved adhesion of the joining layer to the cBN sintered body, thereby improving joining force between the cBN sintered body and the joining layer.

CITATION LIST

Patent Literature

PTL 1: Japanese Patent Laying-Open No. 07-291732
PTL 2: Japanese Patent Laying-Open No. 10-158065
PTL 3: Japanese Patent Laying-Open No. 2005-187260
PTL 4: International Publication No. WO 2005/066381
PTL 5: Japanese Patent Laying-Open No. 2007-276079
PTL 6: Japanese Patent Laying-Open No. 11-320218

SUMMARY OF INVENTION

Technical Problem

Each of PTLs 5 and 6 only provides the revision of the material composition of the joining layer. Hence, under severe conditions as demanded by marketplace in recent years, the joining force is insufficient. During working, high stress imposed on the cBN sintered body is concentrated on a portion of the joining interface, with the result that the cBN sintered body is likely to fall. Thus, the problem of falling has not been solved yet.

The present invention has been made to solve the problem, and has its object to provide a cubic boron nitride sintered body tool in which a cubic boron nitride sintered body is joined to a tool base material via a joining layer firmly and highly rigidly to such an extent that it can endure the severe conditions as demanded in recent years.

Solution to Problem

The present inventors have diligently studied a joining method for directly joining a cBN sintered body to a tool base material firmly and highly rigidly. As a result of examining joining strengths between the cBN sintered body and the tool base material joined to each other using various joining layers, it has been found that the most excellent joining strength is obtained when using a joining layer (brazing material) containing Ti, Zr, Cu, Ag, Ni, and the like at an appropriate ratio.

However, in some cases, in a cBN sintered body tool employing such a joining layer containing Ti, Zr, Cu, Ag, Ni, and the like, the cBN sintered body has fallen from the tool base material due to insufficient joining strength between the cBN sintered body and the tool base material when a sintered alloy or a cast iron to be worked has a higher hardness.

To address this, in addition to re-examining the composition of the joining layer, the present inventors have considered to form an irregularity by treating a surface of the cBN sintered body. As a result, it has been found that by forming an appropriate recess in the surface of the cBN sintered body, a contact area between the cBN sintered body and the joining layer is increased and an anchor effect is exhibited, thereby significantly improving the joining force between the cBN sintered body and the joining layer. Thus, the present invention is completed.

Specifically, a cubic boron nitride sintered body tool of the present invention is a cubic boron nitride sintered body tool in which a cubic boron nitride sintered body is joined to a tool base material via a joining layer, wherein: the cubic boron nitride sintered body contains cubic boron nitride particles by not less than 30 volume % and not more than 95 volume % and a binder phase by not less than 5 volume % and not more than 70 volume %; the binder phase is composed of at least one first compound and at least one Al compound, or is composed of at least one second compound; the first compound is a compound composed of at least one element belonging to one of a group IVa element, a group Va element, and a group VIa element in a periodic table, and at least one element selected from a group consisting of nitrogen, carbon, boron, and oxygen, or is a solid solution of the compound; the second compound is a compound selected from a group consisting of a Co compound, an Al compound, and a W compound, or is a solid solution of the compound; the joining layer contains Ti by 5 mass % or greater and Zr by 5 mass % or greater relative to a whole of the joining layer with a remainder thereof containing Cu while a total of the Ti and the Zr is 90 mass % or smaller, or the joining layer contains Ti by 1 mass % or greater and Cu by 15 mass % or greater with a remainder thereof containing Ag; and assuming that, in at least one cross sectional surface of the cubic boron nitride sintered body tool taken along a plane perpendicular to a joining surface having a largest area in joining surfaces between the cubic boron nitride sintered body and the joining layer, any adjacent two of the cubic boron nitride particles along the joining surface between the cubic boron nitride sintered body and the joining layer are a first cubic boron nitride particle and a second cubic boron nitride particle, assuming that a point A represents an intersection close to the second cubic boron nitride particle among intersections at which the first cubic boron nitride particle, the joining layer, and the binder phase are in contact with one another, and a point B represents an intersection close to point A among intersections at which the second cubic boron nitride particle, the joining layer, and the binder phase are in contact with one another, assuming that a point C represents a point away from point A, along a boundary line on which the first cubic boron nitride particle and the joining layer are in contact with each other, by ¼ of a length of a line segment connecting point A and point B to each other, and assuming that a point D represents a point away from point B, along a boundary line on which the second cubic boron nitride particle and the joining layer are in contact with each other, by ¼ of the length of the line segment connecting point A and point B to each other, a value obtained when an area of a region surrounded by a line segment connecting point C and point D to each other, the first cubic boron nitride particle, the second cubic boron nitride particle, and the binder phase is divided by the length of the line segment connecting point A and point B to each other is not less than 0.14 μm and not more than 0.6 μm.

The joining layer preferably contains Ni by 5 mass % or greater, more preferably, contains Ni by 15 mass % or greater.

The cubic boron nitride sintered body preferably contains the cubic boron nitride particles by not less than 65 volume % and not more than 95 volume %.

The binder phase preferably further contains one or both of W by not less than 0.1 mass % and not more than 5 mass % and Si by 2 mass % or smaller.

The cubic boron nitride particles preferably contains Mg by not less than 0.03 mass % and not more than 1 mass % and Li by not less than 0.05 mass % and not more than 0.5 mass %.

Advantageous Effects of Invention

Because the cBN sintered body tool of the present invention is configured as described above, as in its object, there can be provided a cubic boron nitride sintered body tool in which a cBN sintered body is joined to a tool base material firmly and highly rigidly such that it can endure the severe conditions as demanded in recent years.

DESCRIPTION OF EMBODIMENTS

The following further describes each configuration of a cubic boron nitride sintered body tool in the present invention.

<Cubic Boron Nitride Sintered Body Tool>

FIG. 1(a) is a schematic cross sectional view showing a cubic boron nitride sintered body tool of the present invention. As shown in FIG. 1(a), in a cubic boron nitride sintered body tool 1 of the present invention, a cubic boron nitride sintered body 2 is joined to a tool base material 4 via a joining layer 3. Cubic boron nitride sintered body 2 contains cubic boron nitride particles by not less than 30 volume % and not more than 95 volume %, and a binder phase by not less than 5 volume % and not more than 70 volume %. The cubic boron nitride sintered body characteristically has a surface in which a portion of the binder phase has a depressed shape as described below.

FIG. 1(b) is an enlarged view of a cross sectional surface of the cubic boron nitride sintered body tool of the present invention taken along a plane perpendicular to a joining surface having the largest area in joining surfaces between the cubic boron nitride sintered body and the joining layer. As shown in FIG. 1(b), the cubic boron nitride sintered body tool of the present invention has the following feature. That is, it is assumed that in the cross sectional surface of the cubic boron nitride sintered body tool, any adjacent two of the cubic boron nitride particles along the joining surface between the cubic boron nitride sintered body and the joining layer are a first cubic boron nitride particle 7 and a second cubic boron nitride particle 8. It is assumed that a point A represents an intersection close to the second cubic boron nitride particle among intersections at which first cubic boron nitride particle 7, joining layer 3, and binder phase 6 are in contact with one another, and a point B represents an intersection close to point A among intersections at which second cubic boron nitride particle 8, joining layer 3, and binder phase 6 are in contact with one another. It is assumed that a point C represents a point away from point A, along a boundary line on which first cubic boron nitride particle 7 and joining layer 3 are in contact with each other, by ¼ of a length of a line segment connecting point A and point B to each other. It is assumed that a point D represents a point away from point B, along a boundary line on which second cubic boron nitride particle 8 and joining layer 3 are in contact with each other, by ¼ of the length of the line segment connecting point A and point B to each other. A value (hereinafter, also referred to as "recess coefficient") obtained when an area of a region surrounded by a line segment connecting point C and point D to each other, first cubic boron nitride particle 7, second cubic boron nitride particle 8, and binder phase 6 is divided by the length of the line segment connecting point A and point B to each other is not less than 0.14 μm and not more than 0.6 μm.

Figure 2:
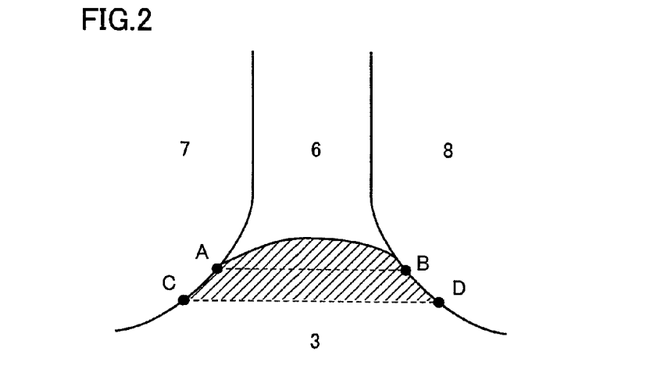
FIG. 2 is an enlarged cross sectional view of the joining surface between the cubic boron nitride sintered body and the joining layer.
Figure 3:
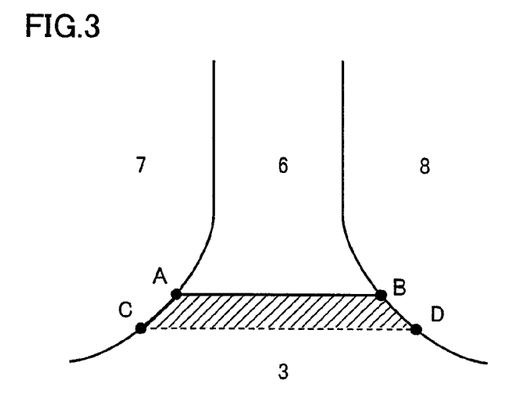
FIG. 3 is an enlarged cross sectional view of the joining surface between the cubic boron nitride sintered body and the joining layer.

The recess coefficient represents a degree of depression of the binder phase in the surface of the cBN sintered body. When the surface of the cBN sintered body is treated to have a recess so as to satisfy the above-described numerical range, a contact area between the cBN sintered body and joining layer 3 is increased and an anchor effect can be exhibited. Accordingly, joining strength between the cBN sintered body and joining layer 3 can be significantly improved. When the recess coefficient is more than 0.6 μm, the depression of the binder phase is too large (the recess is too deep) as shown in FIG. 2, with the result that the cBN particles are likely to fall and stress is likely to be concentrated. Accordingly, cracks are likely to be generated from the recess, thus resulting in decreased joining force. On the other hand, when the recess is less than 0.14 μm, the binder phase is not sufficiently depressed in the surface of the cBN sintered body (the recess is too shallow) as shown in FIG. 3, i.e., the surface of the cBN sintered body is relatively smooth. Accordingly, no anchor effect is obtained, thus failing to improve the joining strength between the cubic boron nitride sintered body and the joining layer.

Employed as the recess coefficient in the present invention is an average value of recess coefficients in arbitrary 30 locations. Each of the recess coefficients is determined by observing two adjacent cBN particles through observation of the above-described cross sectional surface using an SEM at a magnification of ×20000. Such a cBN sintered body has a surface shape differing depending on a volume ratio of the cBN particles in the cBN sintered body. Hence, a surface shape allowing for improvement of joining strength cannot be defined by a conventionally known parameter for surface roughness (such as Ra, Sm, or the like). To address this, in the present invention, as described above, the surface shape of the cBN sintered body (the shape of the recess) is defined by the area of the region surrounded by each of the four defined points, point A to point D, the cubic boron nitride particles, and the binder phase. In this way, a condition for the surface shape allowing for improvement of joining strength between the cBN sintered body and the joining layer can be defined irrespective of a magnitude of the volume ratio of the cBN particles in the cBN sintered body, thereby providing very excellent industrial applicability.

The cBN sintered body tool of the present invention having such characteristics can be effectively used for machining of a sintered alloy or a difficult-to-cut cast iron, and can be also suitably used for various working of other general metals.

When the cBN sintered body tool according to the present invention is used for cutting, the cBN sintered body tool can be very useful as a drill, an end mill, a cutting insert for milling or turning, a metal saw, a gear cutting tool, a reamer, a tap, or a tip for crankshaft pin milling, and the like, for example.

Meanwhile, when the cBN sintered body tool of the present invention is used for plastic working, the cBN sintered body tool is very useful as a punch press mold, a mold for dice, friction welding, and the like, for example. The cBN sintered body tool is also very useful as an engine component, an HDD (hard disk drive), an HDD head, a capstan, a wafer chuck, a semiconductor transportation arm, components in an automobile drive system, a zoom lens sealing ring for a camera, and a friction stir welding tool, for example.

Figure 1:
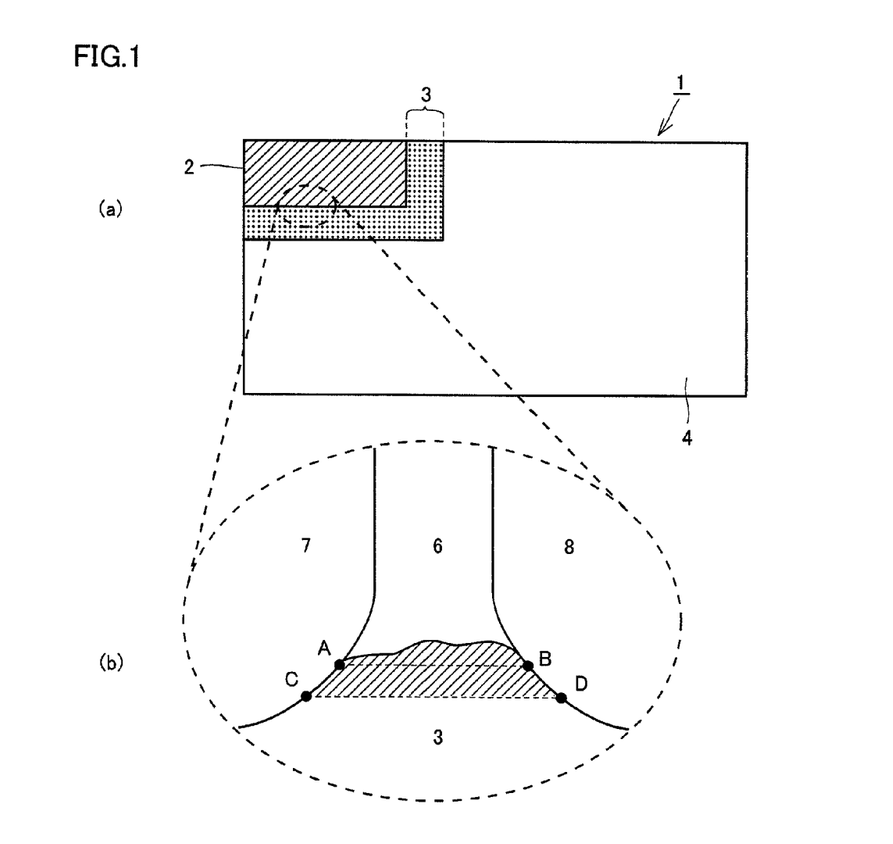
FIG. 1(a) is a schematic cross sectional view of a cubic boron nitride sintered body tool of the present invention.
FIG. 1(b) is an enlarged cross sectional view of a joining surface between a cubic boron nitride sintered body and a joining layer.

It should be noted that FIG. 1 shows that the cBN sintered body is joined to only one location of the cutting edge of the cBN sintered body tool, but the present invention is not limited to the embodiment in which the cBN sintered body is provided only in such a location. To two or more locations in the cBN sintered body tool, cBN sintered bodies may be joined.

<Cubic Boron Nitride Sintered Body>

CBN sintered body 2 used in cBN sintered body tool 1 of the present invention is characterized by containing the cubic boron nitride particles by not less than 30 volume % and not more than 95 volume % and the binder phase by not less than 5 volume % and not more than 70 volume %.

Such a cBN sintered body 2 preferably has a minimum thickness of 0.7 mm to 1.5 mm, more preferably, 1.0 mm to 1.3 mm. Here, the "minimum thickness of the cBN sintered body" refers to a thickness of a thinnest portion of the cBN sintered body. If the minimum thickness of cBN sintered body 2 is less than 0.7 mm and the wear width exceeds 0.7 mm when used for cutting, the cutting is performed by tool base material 4 to result in extremely decreased life. On the other hand, when the minimum thickness of cBN sintered body 2 exceeds 1.5 mm, it requires a considerable effort to polish the cutting edge.

<Cubic Boron Nitride Particle>

The present invention is characterized in that the cubic boron nitride particles are contained in the cBN sintered body by not less than 30 volume % and not more than 95 volume %. When the cBN sintered body contains the cBN particles by less than 30 volume %, the wear resistance is insufficient. When the cBN sintered body contains the cBN particles by more than 95 volume %, sinterability thereof is deteriorated. To balance the wear resistance and the sinterability, the content of cBN is preferably set at not less than 65 volume % and not more than 95 volume %.

The cubic boron nitride particle preferably contains Mg by not less than 0.03 mass % and not more than 1 mass %, and Li by not less than 0.05 mass % and not more than 0.5 mass %. The Mg and Li are contained as inevitable impurities in a catalyst when fabricating the cBN particles. When joining the cBN sintered body by means of the joining layer, these inevitable impurities are diffused from the cBN particles to the joining layer, thereby causing a fine depression in each of the surfaces of the cBN particles. Accordingly, a contact area between the cBN sintered body and the joining layer becomes large to improve the joining strength.

When Mg is contained in each of the cubic boron nitride particles by less than 0.03 mass %, Mg is less likely to be diffused from the cBN particles to the joining layer. Accordingly, the depression is not formed in the surfaces of the cBN particles, with the result that the joining strength between cBN sintered body 2 and joining layer 3 tends to be less likely improved. Similar tendency is obtained when the cubic boron nitride particle contains Li by less than 0.05 mass %.

On the other hand, when the cubic boron nitride particle contains Mg by more than 1 mass % or contains the Li by more than 0.5 mass %, the ratio of the inevitable impurities in the cBN particle becomes large to unfavorably result in tendency of decrease of the hardness of the cBN sintered body.

<Binder Phase>

In the present invention, the binder phase contained in the cBN sintered body exhibits a function of binding the cBN particles to one another. A feature of the present invention lies in that the binder phase is contained in the cBN sintered body by not less than 5 volume % and not more than 70 volume %. Here, when the cBN sintered body contains the binder phase by less than 5 volume %, an amount of component for binding the cBN particles to one another becomes too small, with the result that the cBN particles are likely to fall. On the other hand, when the cBN sintered body contains the binder phase by more than 70 volume %, the content of the cBN particles becomes insufficient to result in insufficient wear resistance.

A feature of the present invention lies in that the binder phase is composed of at least one first compound and at least one Al compound or is composed of at least one second compound. Accordingly, wear resistance particularly good for machining of a sintered alloy or a cast iron can be obtained.

Here, the first compound is a compound composed of at least one element selected from a group consisting of a group IVa element, a group Va element, and a group VIa element in the periodic table, and at least one element selected from a group consisting of nitrogen, carbon, boron, and oxygen. Alternatively, the first compound is a solid solution of this compound. On the other hand, the second compound is a compound selected from a group consisting of a Co compound, an Al compound, and a W compound, or is a solid solution of this compound. Examples of the "Co compound" include $W_2Co_{21}B_6$, $Co_3W_3C$, and $W_3CoB_3$. Examples of the "Al compound" include $Al_2O_3$. Examples of the W compound include WC, $W_2Co_{21}B_6$, $Co_3W_3C$, and $W_3CoB_3$.

The first compound or the second compound thus contained in the composition of the binder phase allows for improved hardness of the cBN sintered body, thereby attaining excellent wear resistance of the cBN sintered body tool. In particular, when the Co compound is employed as a main component of the material for the binder phase, there is provided an effect of improving the sinterability of the cBN sintered body.

Further, in addition to the above-described composition, the binder phase preferably further contains one or both of WC and Si. WC and Si have affinity with a below-described material composing joining layer 3, and therefore allows the material composing joining layer 3 to be wettable to cBN sintered body 2.

W in WC is preferably contained in the binder phase by not less than 0.1 mass % and not more than 5 mass %. Further, Si is more preferably contained in the binder phase by not less than 0.01 mass % and not more than 1 mass %. When the binder phase contains W by less than 0.1 mass %, the wettability of the material composing joining layer 3 to cBN sintered body 2 is insufficient, with the result that joining strength between cBN sintered body 2 and joining layer 3 tends to be weak. Similar tendency is obtained when Si is contained in the binder phase by less than 0.01 mass %. Meanwhile, when W is contained in the joining layer by more than 5 mass % or Si is contained by more than 1 mass %, the wear resistance of the cBN sintered body is decreased.

<Joining Layer>

Joining layer 3 of the present invention serves to join the cBN sintered body and the tool base material to each other. Such a joining layer 3 contains Ti by 5 mass % or greater and contains Zr by 5 mass % or greater relative to the whole of joining layer 3 with a remainder thereof containing Cu while a total of Ti and Zr is 90 mass % or smaller (hereinafter, also referred to as "first composition"). Alternatively, joining layer 3 contains Ti by 1 mass % or greater and contains Cu by 15 mass % or greater with a remainder thereof containing Ag (hereinafter, also referred to as "second composition").

When such a joining layer 3 has the first composition, Cu has an effect of lowering the melting point of the material composing the joining layer and containing Ti and Zr as its main components. Accordingly, the process of joining can be performed at a low temperature. Moreover, because Cu has a high elastic modulus, Cu thus contained provides an effect of absorbing distortion resulting from a thermal expansion difference between cBN sintered body 2 and tool base material 4 when working heat generated during working flows into tool base material 4 through cBN sintered body 2. When Cu is contained by less than 10 mass %, these effects are not obtained. When Cu is contained by more than 90 mass %, the contents of Ti and Zr are relatively decreased to result in decreased joining strength.

When the joining layer has the first composition, each of Ti and Zr therein has a higher high-temperature strength than those of Ag and Cu, and the wettability of the material composing the joining layer is significantly improved to provide an effect of improving the joining strength between cBN sintered body 2 and joining layer 3. When Ti or Zr is contained by less than 5 mass %, the high-temperature strength and the effect of improving the joining strength are not obtained. On the other hand, when both Ti and Zr are contained by more than 90 mass % in total, the melting point is increased to unfavorably induce distortion and cracks during joining. The total of the contents of Ti and Zr preferably falls within a range of not less than 10 mass % and not more than 90 mass %. It is particularly preferable to combine this range with the suitable range of the above-described content of Cu because the joining strength becomes maximum.

In particular, when joining layer 3 contains Ti at a content of not less than 20 mass % and not more than 30 mass % and contains Zr at a content of not less than 20 mass % and not more than 30 mass %, ternary eutectic resulting from Ti, Zr, and Cu noticeably causes lowering of the melting point, thus favorably resulting in joining at a low melting point.

Further, when joining layer 3 has the second composition, Ti therein has a higher high-temperature strength than those of Ag and Cu, and the wettability of the material composing joining layer 3 is significantly improved to provide an effect of improving the joining strength. When Ti is contained by less than 1 mass %, the high-temperature strength and the effect of improving joining strength are not obtained. Hence, this is not preferable. It is particularly preferable to use it in combination with Cu contained by 15 mass % or greater as described above because the joining strength becomes maximum. With joining layer 3 having such a composition, joining can be attained at a relatively low temperature of not less than 800° C. and not more than 1000° C.

Further, joining layer 3 containing Ni by 5 mass % or greater allows for improved wettability to cBN sintered body. Accordingly, the material composing joining layer 3 flows in the depression of the surface of the cBN sintered body (i.e., the recess of the binder phase or the recess of the surface of each cBN particle), thereby drastically improving the joining strength.

The thickness of joining layer 3 is not particularly limited, and is normally not less than 10 μm and not more than 200 μm.

<Tool Base Material>

In the present invention, any tool base material 4 to which cBN sintered body 2 is joined can, be employed as long as tool base material 4 is a conventionally known as tool base material 4 of this type and therefore tool base material 4 is not particularly limited. For example, a material capable of enduring working resistance, such as cemented carbide, steel, or ceramics, can be suitably used as tool base material 4. In consideration of material strength and the like of tool base material 4, cemented carbide is more suitably used.

<Method for Manufacturing cBN Sintered Body Tool>

The cBN sintered body tool of the present invention can be obtained in the following manner. First, the cBN particles and raw material powders to compose the binder phase are sintered to fabricate the cBN sintered body. Then, surface treatment is performed to remove oxygen from the surface of such a cBN sintered body, and the cBN sintered body is joined to the tool base material via the joining layer. The following describes a method for manufacturing the cBN sintered body tool of the present invention.

<Step of Fabricating cBN Sintered Body>

CBN sintered body 2 used in the present invention is fabricated in the following manner. First, the cBN particles and the raw material powders to compose the binder phase are introduced into an ultra-high pressure apparatus and these powders are subjected to ultra-high pressure sintering, thereby fabricating a bulk sintered body. Here, the ultra-high pressure sintering is preferably performed at a low pressure, specifically, the ultra-high pressure sintering is preferably performed at not less than 3 GPa and not more than 7 GPa. Further, the ultra-high pressure sintering is preferably performed at a temperature of not less than 1100° C. and not more than 1900° C. for a treatment time of not less than 10 minutes and not more than 180 minutes.

Next, the bulk sintered body obtained as above is set in an electric discharge machine and is thereafter cut into a desired shape using a brass wire, thereby obtaining a cBN sintered body. The cutting with the brass wire is preferably performed in water in view of manufacturing efficiency. If the cutting is performed in oil, the manufacturing efficiency might be decreased.

The cBN sintered body formed by cutting the bulk sintered body is not particularly limited as long as the cBN sintered body has a shape that allows the cBN sintered body to be adhered to the tool base material while being used. The cBN sintered body can have a shape of rectangular solid, triangular prism, triangular pyramid, prismatic column, or cylindrical column, for example. Then, the surface thereof obtained through the cutting with the brass wire is polished, thereby obtaining a cBN sintered body.

<Surface Treatment Step>

If the cBN sintered body fabricated by the above-described method is not subjected to the surface treatment before the joining process that employs the material to compose the joining layer, the contact area therebetween becomes small and the anchor effect is not obtained. Accordingly, the joining strength between the cBN sintered body and the joining layer becomes weak.

Thus, in the present invention, the cBN sintered body fabricated by the above-described method is subjected to surface treatment employing a method such as plasma treatment, electron beam treatment, chemical treatment, laser treatment, or blasting treatment. Accordingly, only a portion of the binder phase in the surface of the cBN sintered body is selectively removed, thereby forming the recess in the surface of the cBN sintered body. Conventionally, the treatment is provided to the entire surface of the cBN sintered body so as to smooth the surface of the cBN sintered body. In contrast, in the present invention, the surface treatment is characteristically provided such that only the binder phase is polished without polishing the surfaces of the cBN particles in the surface of the cBN sintered body. If the surface treatment is strong surface treatment of grinding even the surfaces of the cBN particles such as a grinding process employing a conventional diamond grindstone, the surface of the cBN sintered body is not provided with the recess and therefore becomes smooth. Accordingly, no anchor effect is obtained, thus failing to improve the joining strength. It should be noted that apart from the surface treatment method illustrated above, any method can be used as long as the method is capable of selectively removing only the binder phase in the surface of the cBN sintered body.

With such surface treatment, the portion of the binder phase in the surface of the cBN sintered body is removed to form the recess in the surface. Accordingly, the contact area between the cBN sintered body and the joining layer is increased, and the anchor effect is provided from the recess. In this way, the joining strength between the cBN sintered body and the joining layer can be improved. Among the surface treatment methods exemplified above, the plasma treatment, the electron beam treatment, and the chemical treatment are particularly effective as the surface treatment method capable of selectively removing only the binder phase.

<Surface Treatment Method for cBN Sintered Body>

In the present invention, it is preferable to selectively treat only the binder phase in the surface of the cBN sintered body using one or more of the following surface treatment methods (1) to (5).

(1) Ultrasonic Treatment

In the ultrasonic treatment, the cBN sintered body is soaked in a solvent such as pure water and the cBN sintered body and the solvent are subjected to ultrasonic wave for not less than 1 minute and not more than 20 minutes, thereby removing the portion of the binder phase in the surface of the cBN sintered body. The ultrasonic wave used in the ultrasonic treatment is preferably generated with an output of not less than 50 W and not more than 500 W. The ultrasonic wave preferably has a frequency of not less than 10 kHz and not more than 50 kHz.

(2) Plasma Treatment

The plasma treatment is preferably performed as follows. First, the cBN sintered body is placed on an electrode of a vacuum container, and the vacuum container is vacuumed to a pressure of 0.1 Pa or smaller. Then, Ar gas is introduced into the vacuum container to increase the internal pressure to not less than 0.1 Pa and not more than 10 Pa. Then, high-frequency electric power is applied to the cBN sintered body to generate plasma, thereby removing the portion of the binder phase in the surface of the cBN sintered body. Here, the high-frequency electric power preferably has an oscillating frequency of not less than 10 MHz and not more than 20 MHz and preferably has an output of not less than 500 W and not more than 1500 W.

(3) Electron Beam Treatment

In the electron beam treatment, first, the cBN sintered body is placed in a vacuum container and then pressure in the vacuum container is reduced to 0.03 Pa. Then, Ar gas is introduced into the vacuum container to obtain an internal pressure of 0.05 Pa. Thereafter, the surface of the cBN sintered body is irradiated with electron beams for approximately 10000 times, thereby removing the portion of the binder phase in the surface of the cBN sintered body. Here, the electron beams preferably have an amount of energy of not less than 1 J/cm$^2$ and not more than 5 J/cm$^2$. The irradiation of electron beams are performed for not less than 1 second and not more than 100 seconds for each time.

(4) Chemical Treatment

In the chemical treatment, first, 3 mass % of hydrogen peroxide water and 10 mass % of sodium hydroxide aqueous solution are blended at a mass ratio of 1:0.5 to 1:3, thereby obtaining a mixed liquid. Then, the cBN sintered body is soaked in the mixed liquid to remove the portion of the binder phase in the surface of the cBN sintered body. The cBN sintered body is preferably soaked in the mixed liquid for not less than 10 minutes and not more than 60 minutes.

(5) Laser Treatment

In the laser treatment, first, the cBN sintered body is placed in a laser treatment apparatus with its surface to be joined facing upward. Then, the output of the laser treatment apparatus is set at not less than 5 W and not more than 15 W, and the entire surface of the cBN sintered body is irradiated with laser light having a spot diameter of 50 μm, thereby removing the portion of the binder phase in the surface of the cBN sintered body. The laser light preferably has a repetition frequency of not less than 20 kHz and not more than 300 kHz.

<Joining Step>

After removing the portion of the binder phase in the surface of the cBN sintered body by means of any of the above-described surface treatment methods, the material to compose the joining layer is interposed between the cBN sintered body and the tool base material. Then, they are placed in a vacuum furnace. Then, pressure in the vacuum furnace is reduced to $2\times10^{-2}$ Pa or smaller and temperature in the furnace is set at 750° C. or greater, thereby melting the material to compose the joining layer. Accordingly, the cBN sintered body and the tool base material are joined to each other.

Next, the cBN sintered body and the tool base material thus joined to each other are taken out from the vacuum furnace and are cooled, whereby the melted material to compose the joining layer is solidified. The material to compose the joining layer is solidified by this cooling and is formed into joining layer 3. Then, a joining surface between cBN sintered body 2 and tool base material 4 are grinded to smooth the joining surface between cBN sintered body 2 and tool base material 4, thereby obtaining the cBN sintered body tool of the present invention.

EXAMPLES

While the present invention will be described in more detail hereinafter with reference to examples, the present invention is not limited thereto.

Example 1

A cBN sintered body tool was fabricated as below. First, TiN powders having a mean particle size of 20 μm and Al powders having a mean particle size of 20 μm were mixed at a mass ratio of TiN:Al=4:1. Then, the mixture was subjected to heat treatment in vacuum at 1250° C. for 30 minutes. The mixture obtained through the heat treatment was pulverized using a ball having φ of 4 mm and made of cemented carbide and a pot made of cemented carbide. In this way, the raw material powders to compose the binder phase were obtained.

Then, the obtained raw material powders to compose the binder phase were mixed with cBN particles having a mean particle size of 4 μm so as to attain a cBN content of 72 volume %. The mixture thus obtained was placed in a vacuum furnace and temperature therein was increased to 950° C. Then, the mixture was retained therein for 30 minutes to degas these powders.

Next, the powders thus degassed were layered on a supporting plate made of cemented carbide and they were introduced into a capsule made of Nb. Then, the capsule was placed in an ultra-high pressure apparatus. Then, in the ultra-high pressure apparatus, sintering was performed for 20 minutes under a pressure of 5 GPa at a temperature of 1300° C. Then, a sintered body was taken out from the capsule made of Mo, and was grinded and polished for the purpose of shaping, thereby fabricating a bulk sintered body in the form of a plate. Using the same method as above, two bulk sintered bodies were fabricated for composition analysis apart from the one described above.

One of the bulk sintered bodies obtained as above was cut by an electric discharge machine using a brass wire. In this way, there was obtained a cBN sintered body that had a shape of triangular prism having a bottom surface formed by an isosceles triangle whose two sides were 2 mm and whose vertex angle therebetween was 80°. The cBN sintered body had a thickness of 1.2 mm. The cBN sintered body thus obtained was subjected to chemical treatment. In the chemical treatment, first, 3 mass % of hydrogen peroxide water and 10 mass % of sodium hydroxide aqueous solution were blended at a ratio of 2:3, thereby obtaining a mixed liquid. Then, the cBN sintered body was soaked in this mixed liquid for 30 minutes to treat the surface of the cBN sintered body.

Next, a tool base material made of cemented carbide was prepared and a material to compose the joining layer was disposed on an interface between the cBN sintered body and the tool base material. Then, they were placed in a vacuum furnace. The material to compose the joining layer contained Ti by 25 mass %, Zr by 25 mass %, and Cu by 30 mass % with its remainder containing Ni by 20 mass %. Then, pressure in the vacuum furnace was set at $1\times10^{-2}$ Pa and temperature therein was increased to 850° C., thereby melting the material to compose the joining layer. Accordingly, the cBN sintered body was joined to the tool base material.

Then, the cBN sintered body and the tool base material thus joined to each other were taken out from the reaction furnace and were cooled. Next, finishing was performed by polishing a joining surface between the cBN sintered body and the tool base material. In this way, a cBN sintered body tool was fabricated which had a shape of CNGA120408 in the ISO model number and which included the cBN sintered body at its vertex angle portion.

Examples 2-7 and Comparative Examples 1-6

CBN sintered body tools of Examples 2-7 and Comparative Examples 1-6 were fabricated using the same method as that in Example 1 except that surfaces of cBN sintered bodies were changed from that of the cBN sintered body tool of Example 1 as indicated by the column "Recess Coefficient" in Table 1 by changing times during which the cBN sintered bodies were soaked in mixed liquids.

TABLE 1

| | | cBN Content (Volume %) | Mg (Mass %) | Li (Mass %) | Composition of Binder Phase | W (Mass %) |
|---|---|---|---|---|---|---|
| Examples | 1 | 72 | 0.03 | 0.06 | TiN, $TiB_2$, TiAlN, AlN, $AlB_2$ | 0.2 |
| | 2 | 72 | 0.03 | 0.06 | TiN, $TiB_2$, TiAlN, AlN, $AlB_2$ | 0.2 |
| | 3 | 72 | 0.03 | 0.06 | TiN, $TiB_2$, TiAlN, AlN, $AlB_2$ | 0.2 |
| | 4 | 72 | 0.03 | 0.06 | TiN, $TiB_2$, TiAlN, AlN, $AlB_2$ | 0.2 |
| | 5 | 72 | 0.03 | 0.06 | TiN, $TiB_2$, TiAlN, AlN, $AlB_2$ | 0.2 |
| | 6 | 72 | 0.03 | 0.06 | TiN, $TiB_2$, TiAlN, AlN, $AlB_2$ | 0.2 |
| | 7 | 72 | 0.03 | 0.06 | TiN, $TiB_2$, TiAlN, AlN, $AlB_2$ | 0.2 |
| | 8 | 72 | 0.03 | 0.06 | TiN, $TiB_2$, TiAlN, AlN, $AlB_2$ | 0.2 |
| | 9 | 72 | 0.03 | 0.06 | TiN, $TiB_2$, TiAlN, AlN, $AlB_2$ | 0.2 |
| Comparative Examples | 1 | 72 | 0.03 | 0.06 | TiN, $TiB_2$, TiAlN, AlN, $AlB_2$ | 0.2 |
| | 2 | 72 | 0.03 | 0.06 | TiN, $TiB_2$, TiAlN, AlN, $AlB_2$ | 0.2 |
| | 3 | 72 | 0.03 | 0.06 | TiN, $TiB_2$, TiAlN, AlN, $AlB_2$ | 0.2 |
| | 4 | 72 | 0.03 | 0.06 | TiN, $TiB_2$, TiAlN, AlN, $AlB_2$ | 0.2 |
| | 5 | 72 | 0.03 | 0.06 | TiN, $TiB_2$, TiAlN, AlN, $AlB_2$ | 0.2 |
| | 6 | 72 | 0.03 | 0.06 | TiN, $TiB_2$, TiAlN, AlN, $AlB_2$ | 0.2 |
| | 7 | 72 | 0.03 | 0.06 | TiN, $TiB_2$, TiAlN, AlN, $AlB_2$ | 0.2 |

| | | Binder Phase Si (Mass %) | Recess Coefficient (μm) | Joining Layer Material to Compose Joining Layer(Mass %) | Surface Treatment Method |
|---|---|---|---|---|---|
| Examples | 1 | 0.08 | 0.14 | Ti(25), Zr(25), Cu(30), Ni(20) | Chemical Treatment |
| | 2 | 0.08 | 0.16 | Ti(25), Zr(25), Cu(30), Ni(20) | Chemical Treatment |
| | 3 | 0.08 | 0.2 | Ti(25), Zr(25), Cu(30), Ni(20) | Chemical Treatment |
| | 4 | 0.08 | 0.3 | Ti(25), Zr(25), Cu(30), Ni(20) | Chemical Treatment |
| | 5 | 0.08 | 0.5 | Ti(25), Zr(25), Cu(30), Ni(20) | Chemical Treatment |
| | 6 | 0.08 | 0.55 | Ti(25), Zr(25), Cu(30), Ni(20) | Chemical Treatment |
| | 7 | 0.08 | 0.6 | Ti(25), Zr(25), Cu(30), Ni(20) | Chemical Treatment |
| | 8 | 0.08 | 0.2 | Ti(30), Zr(20), Cu(30), Ni(20) | Chemical Treatment |
| | 9 | 0.08 | 0.2 | Ti(20), Zr(30), Cu(30), Ni(20) | Chemical Treatment |
| Comparative Examples | 1 | 0.08 | 0.04 | Ti(25), Zr(25), Cu(30), Ni(20) | Chemical Treatment |
| | 2 | 0.08 | 0.08 | Ti(25), Zr(25), Cu(30), Ni(20) | Chemical Treatment |
| | 3 | 0.08 | 0.12 | Ti(25), Zr(25), Cu(30), Ni(20) | Chemical Treatment |
| | 4 | 0.08 | 0.65 | Ti(25), Zr(25), Cu(30), Ni(20) | Chemical Treatment |
| | 5 | 0.08 | 0.7 | Ti(25), Zr(25), Cu(30), Ni(20) | Chemical Treatment |
| | 6 | 0.08 | 1 | Ti(25), Zr(25), Cu(30), Ni(20) | Chemical Treatment |
| | 7 | 0.08 | 0.2 | Ti(3), Zr(3), Cu(74), Ni(20) | Chemical Treatment |

Examples 8-9 and Comparative Example 7

CBN sintered body tools of Examples 8-9 and Comparative Example 7 were fabricated using the same method as that in Example 3 except that materials to compose joining layers were changed from that in the cBN sintered body tool of Example 3 as indicated in the column "Material to Compose Joining Layer" in Table 1.

Example 10

A cBN sintered body tool of Example 10 was fabricated using the same method as that in Example 3 except that laser treatment was employed for the surface treatment method unlike the cBN sintered body tool of Example 3. Here, the laser treatment was performed as follows. First, the cBN sintered body was placed with its surface to be joined facing upward. Then, a laser treatment apparatus was set to have an output of 10 W and to irradiate the surface of the cBN sintered body with laser light having a spot diameter of 50 μm, a repetition frequency of 100 kHz, and a wavelength of 1064 nm.

Examples 11-18

CBN sintered body tools of Examples 11-18 were fabricated using the same method as that in Example 10 except that materials to compose joining layers were changed from that in the cBN sintered body tool of Example 10 as shown in the column "Material to Compose Joining Layer" in Table 2.

TABLE 2

| | | cBN Content (Volume %) | Mg (Mass %) | Li (Mass %) | Composition of Binder Phase | W (Mass %) |
|---|---|---|---|---|---|---|
| Examples | 10 | 72 | 0.03 | 0.06 | TiN, $TiB_2$, TiAlN, AlN, $AlB_2$ | 0.2 |
| | 11 | 72 | 0.03 | 0.06 | TiN, $TiB_2$, TiAlN, AlN, $AlB_2$ | 0.2 |

TABLE 2-continued

| | | | | | | |
|---|---|---|---|---|---|---|
| 12 | 72 | 0.03 | 0.06 | TiN, $TiB_2$, TiAlN, AlN, $AlB_2$ | 0.2 |
| 13 | 72 | 0.03 | 0.06 | TiN, $TiB_2$, TiAlN, AlN, $AlB_2$ | 0.2 |
| 14 | 72 | 0.03 | 0.06 | TiN, $TiB_2$, TiAlN, AlN, $AlB_2$ | 0.2 |
| 15 | 72 | 0.03 | 0.06 | TiN, $TiB_2$, TiAlN, AlN, $AlB_2$ | 0.2 |
| 16 | 72 | 0.03 | 0.06 | TiN, $TiB_2$, TiAlN, AlN, $AlB_2$ | 0.2 |
| 17 | 72 | 0.03 | 0.06 | TiN, $TiB_2$, TiAlN, AlN, $AlB_2$ | 0.2 |
| 18 | 72 | 0.03 | 0.06 | TiN, $TiB_2$, TiAlN, AlN, $AlB_2$ | 0.2 |

| | | cBN Sintered Body | | | |
|---|---|---|---|---|---|
| | | Binder Phase Si (Mass %) | Recess Coefficient (μm) | Joining Layer Material to Compose Joining Layer(Mass %) | Surface Treatment Method |
| Examples | 10 | 0.08 | 0.2 | Ti(25), Zr(25), Cu(30), Ni(20) | Laser Treatment |
| | 11 | 0.08 | 0.2 | Ti(25), Zr(25), Cu(32.5), Ni(17.5) | Laser Treatment |
| | 12 | 0.08 | 0.2 | Ti(25), Zr(25), Cu(35), Ni(15) | Laser Treatment |
| | 13 | 0.08 | 0.2 | Ti(25), Zr(25), Cu(37.5), Ni(12.5) | Laser Treatment |
| | 14 | 0.08 | 0.2 | Ti(25), Zr(25), Cu(40), Ni(10) | Laser Treatment |
| | 15 | 0.08 | 0.2 | Ti(25), Zr(25), Cu(42.5), Ni(7.5) | Laser Treatment |
| | 16 | 0.08 | 0.2 | Ti(25), Zr(25), Cu(45), Ni(5) | Laser Treatment |
| | 17 | 0.08 | 0.2 | Ti(25), Zr(25), Cu(47.5), Ni(2.5) | Laser Treatment |
| | 18 | 0.08 | 0.2 | Ti(25), Zr(25), Cu(50) | Laser Treatment |

Example 19

A cBN sintered body tool of Example 19 was fabricated using the same method as that in Example 1 except that a cBN content, composition of a binder phase, a material to compose a joining layer, and a surface treatment method are different from those for the cBN sintered body tool of Example 3 as shown in Table 3. Specifically, in Example 19, plasma treatment was performed instead of the chemical treatment as in Example 1. The plasma treatment was performed as follows. First, the cBN sintered body was set on an electrode of a vacuum furnace. Then, pressure in the vacuum furnace was reduced to 0.1 Pa. Thereafter, Ar gas was introduced thereinto to attain an internal pressure of 5 Pa. Then, the cBN sintered body was fed with high-frequency electric power having an oscillating frequency of 13.56 MHz and having an output of 500 W. Accordingly, plasma was generated at the surface of the cBN sintered body, thereby treating the surface of the cBN sintered body.

Examples 20-28

CBN sintered body tools of Example 20-28 were fabricated using the same method as that in Example 19 except that mass ratios of W and Si in binder phases were changed from those in the cBN sintered body tool of Example 19 as shown in the columns "W" and "Si" in Table 3.

Example 29

A cBN sintered body tool of Example 29 was fabricated using the same method as that in Example 3 except that a cBN content, composition of a binder phase, a material to compose a joining layer, and a surface treatment method were different from those for cBN sintered body tool of Example 3 as shown in Table 3. Specifically, in Example 29, electron beam treatment was performed instead of the chemical treatment as in Example 3. The electron beam treatment was performed as follows. First, the cBN sintered body was placed in a vacuum container. Thereafter, pressure in the vacuum container was reduced to 0.03 Pa. Then, Ar gas was introduced into the vacuum container to attain an internal pressure of 0.05 Pa. Then, the surface of the cBN sintered body was irradiated with electron beams of energy of 3 $J/cm^2$ for 8000 times in total. Each irradiation thereof was performed for 10 seconds. In this way, the surface of the cBN sintered body was treated.

Examples 30-38

CBN sintered body tools of Examples 30-38 were fabricated using the same method as that in Example 29 except that mass ratios of Mg and Li in cBN particles and compositions of materials to compose binder phases were changed from those in the cBN sintered body tool of Example 29 as shown in Table 3.

TABLE 3

| | | cBN Sintered Body | | | | | |
|---|---|---|---|---|---|---|---|
| | | cBN | | | | Binder Phase | |
| | | cBN Content (Volume %) | Mg (Mass %) | Li (Mass %) | Composition of Binder Phase | | W (Mass %) |
| Examples | 19 | 45 | 0.03 | 0.06 | TiN, $TiB_2$, TiAlN, TiC, TiCN, TiBN | | 0.2 |
| | 20 | 45 | 0.03 | 0.06 | TiN, $TiB_2$, TiAlN, TiC, TiCN, TiBN | | 0.05 |
| | 21 | 45 | 0.03 | 0.06 | TiN, $TiB_2$, TiAlN, TiC, TiCN, TiBN | | 0.1 |
| | 22 | 45 | 0.03 | 0.06 | TiN, $TiB_2$, TiAlN, TiC, TiCN, TiBN | | 0.5 |
| | 23 | 45 | 0.03 | 0.06 | TiN, $TiB_2$, TiAlN, TiC, TiCN, TiBN | | 2 |
| | 24 | 45 | 0.03 | 0.06 | TiN, $TiB_2$, TiAlN, TiC, TiCN, TiBN | | 5 |
| | 25 | 45 | 0.03 | 0.06 | TiN, $TiB_2$, TiAlN, TiC, TiCN, TiBN | | 0.2 |
| | 26 | 45 | 0.03 | 0.06 | TiN, $TiB_2$, TiAlN, TiC, TiCN, TiBN | | 0.2 |
| | 27 | 45 | 0.03 | 0.06 | TiN, $TiB_2$, TiAlN, TiC, TiCN, TiBN | | 0.2 |

TABLE 3-continued

| | | | | | | |
|---|---|---|---|---|---|---|
| 28 | 45 | 0.03 | 0.06 | TiN, TiB$_2$, TiAlN, TiC, TiCN, TiBN | | 0.2 |
| 29 | 45 | 0.03 | 0.06 | TiN, TiAlN, Al$_2$O$_3$ | | 0.2 |
| 30 | 45 | 0.02 | 0.06 | TiN, TiAlN, Al$_2$O$_3$ | | 0.2 |
| 31 | 45 | 0.05 | 0.06 | TiN, TiAlN, Al$_2$O$_3$ | | 0.2 |
| 32 | 45 | 0.2 | 0.06 | TiN, TiAlN, Al$_2$O$_3$ | | 0.2 |
| 33 | 45 | 0.5 | 0.06 | TiN, TiAlN, Al$_2$O$_3$ | | 0.2 |
| 34 | 45 | 1 | 0.06 | TiN, TiAlN, Al$_2$O$_3$ | | 0.2 |
| 35 | 72 | 0.03 | 0.04 | W$_2$Co$_{21}$B$_6$, Co$_3$W$_3$C, W$_3$CoB$_3$, WC, Co | | 0.2 |
| 36 | 72 | 0.03 | 0.05 | W$_2$Co$_{21}$B$_6$, Co$_3$W$_3$C, W$_3$CoB$_3$, WC, Co | | 0.2 |
| 37 | 72 | 0.03 | 0.2 | W$_2$Co$_{21}$B$_6$, Co$_3$W$_3$C, W$_3$CoB$_3$, WC, Co | | 0.2 |
| 38 | 72 | 0.03 | 0.5 | W$_2$Co$_{21}$B$_6$, Co$_3$W$_3$C, W$_3$CoB$_3$, WC, Co | | 0.2 |

| | | cBN Sintered Body | | | |
|---|---|---|---|---|---|
| | | Binder Phase Si (Mass %) | Recess Coefficient (μm) | Joining Layer Material to Compose Joining Layer(Mass %) | Surface Treatment Method |
| Examples | 19 | 0.08 | 0.2 | Ag(62), Cu(26), Ti(5), Ni(7) | Plasma Treatment |
| | 20 | 0.08 | 0.2 | Ag(62), Cu(26), Ti(5), Ni(7) | Plasma Treatment |
| | 21 | 0.08 | 0.2 | Ag(62), Cu(26), Ti(5), Ni(7) | Plasma Treatment |
| | 22 | 0.08 | 0.2 | Ag(62), Cu(26), Ti(5), Ni(7) | Plasma Treatment |
| | 23 | 0.08 | 0.2 | Ag(62), Cu(26), Ti(5), Ni(7) | Plasma Treatment |
| | 24 | 0.08 | 0.2 | Ag(62), Cu(26), Ti(5), Ni(7) | Plasma Treatment |
| | 25 | 0 | 0.2 | Ag(62), Cu(26), Ti(5), Ni(7) | Plasma Treatment |
| | 26 | 0.5 | 0.2 | Ag(62), Cu(26), Ti(5), Ni(7) | Plasma Treatment |
| | 27 | 1 | 0.2 | Ag(62), Cu(26), Ti(5), Ni(7) | Plasma Treatment |
| | 28 | 2 | 0.2 | Ag(62), Cu(26), Ti(5), Ni(7) | Plasma Treatment |
| | 29 | 0.08 | 0.2 | Ag(64), Cu(26), Ti(5), Ni(5) | Electron Beam |
| | 30 | 0.08 | 0.2 | Ag(64), Cu(26), Ti(5), Ni(5) | Electron Beam |
| | 31 | 0.08 | 0.2 | Ag(64), Cu(26), Ti(5), Ni(5) | Electron Beam |
| | 32 | 0.08 | 0.2 | Ag(64), Cu(26), Ti(5), Ni(5) | Electron Beam |
| | 33 | 0.08 | 0.2 | Ag(64), Cu(26), Ti(5), Ni(5) | Electron Beam |
| | 34 | 0.08 | 0.2 | Ag(64), Cu(26), Ti(5), Ni(5) | Electron Beam |
| | 35 | 0.08 | 0.2 | Ag(64), Cu(26), Ti(5), Ni(5) | Electron Beam |
| | 36 | 0.08 | 0.2 | Ag(64), Cu(26), Ti(5), Ni(5) | Electron Beam |
| | 37 | 0.08 | 0.2 | Ag(64), Cu(26), Ti(5), Ni(5) | Electron Beam |
| | 38 | 0.08 | 0.2 | Ag(64), Cu(26), Ti(5), Ni(5) | Electron Beam |

Each of the cBN sintered body tools of Examples 1-38 fabricated as above was a cubic boron nitride sintered body tool in which a cubic boron nitride sintered body is joined to a tool base material via a joining layer, wherein: the cubic boron nitride sintered body contains cubic boron nitride particles by not less than 30 volume % and not more than 95 volume % and a binder phase by not less than 5 volume % and not more than 70 volume %; the binder phase is composed of at least one first compound and at least one Al compound, or is composed of at least one second compound; the first compound is a compound composed of at least one element belonging to one of a group IVa element, a group Va element, and a group VIa element in a periodic table, and at least one element selected from a group consisting of nitrogen, carbon, boron, and oxygen, or is a solid solution of the compound; the second compound is a compound selected from a group consisting of a Co compound, an Al compound, and a W compound, or is a solid solution of the compound; the joining layer contains Ti by 5 mass % or greater and Zr by 5 mass % or greater relative to a whole of the joining layer with a remainder thereof containing Cu while a total of the Ti and the Zr is 90 mass % or smaller, or the joining layer contains Ti by 1 mass % or greater and Cu by 15 mass % or greater with a remainder thereof containing Ag; and assuming that, in at least one cross sectional surface of the cubic boron nitride sintered body tool taken along a plane perpendicular to a joining surface having a largest area in joining surfaces between the cubic boron nitride sintered body and the joining layer, any adjacent two of the cubic boron nitride particles along the joining surface between the cubic boron nitride sintered body and the joining layer are a first cubic boron nitride particle and a second cubic boron nitride particle, assuming that a point A represents an intersection close to the second cubic boron nitride particle among intersections at which the first cubic boron nitride particle, the joining layer, and the binder phase are in contact with one another, and a point B represents an intersection close to point A among intersections at which the second cubic boron nitride particle, the joining layer, and the binder phase are in contact with one another, assuming that a point C represents a point away from point A, along a boundary line on which the first cubic boron nitride particle and the joining layer are in contact with each other, by ¼ of a length of a line segment connecting point A and point B to each other, and assuming that a point D represents a point away from point B, along a boundary line on which the second cubic boron nitride particle and the joining layer are in contact with each other, by ¼ of the length of the line segment connecting point A and point B to each other, a value obtained when an area of a region surrounded by a line segment connecting point C and point D to each other, the first cubic boron nitride particle, the second cubic boron nitride particle, and the binder phase is divided by the length of the line segment connecting point A and point B to each other is not less than 0.14 μm and not more than 0.6 μm.

(Composition Analysis on cBN Sintered Body)

The composition of the cBN sintered body in one of the cBN sintered bodies of Example 1 obtained as above was examined using X-ray diffraction (XRD). As a result, cBN and the composition of the first compound were detected. The first compound was presumably composed of TiB$_2$, TiN, TiAlN, AlN, and AlB$_2$. Using the same method as above, the composition of the binder phase in each of the cBN sintered bodies of the examples and the comparative examples was detected and is shown in the column "Composition of Binder Phase" in each of Table 1 to Table 3.

Further, contents of Mg, Li, W, and Si elements in another cBN sintered body sample were quantified using a high-frequency inductively coupled plasma (ICP) emission spectrometry method. Specifically, first, the cBN sintered body sample was melted in an alkali solution to produce a salt. Then, the salt was dissolved in an acidic solution to obtain a solution containing the sintered body. In this solution containing the sintered body, using the ICP method, the contents of Mg and Li contained in the cBN component and the contents of W and Si contained as the binder phase components were quantified. Results thereof are shown in the columns "Mg", "Li", "W", and "Si" in each of Table 1 to Table 3.

Here, the "cBN content" in each of Table 1 to Table 3 was calculated as follows. First, the cBN sintered body fabricated in each of the examples and the comparative examples was mirror-polished (a thickness to be polished being smaller than 50 μm). Then, an image of a cBN sintered body structure in an arbitrary region was captured using an electron microscope at a magnification of ×2000. Then, black regions, gray regions, and white regions were observed. Using an attached energy dispersive X-ray spectroscopy (EDX) apparatus, it was confirmed that the black regions represent the cBN particles and the gray regions and the white regions represent the binder phase.

Then, the image captured at a magnification of ×2000 as above was subjected to binarization processing using image processing software and a total area of the regions occupied by the cBN particles (the black regions) in the image was calculated. A percentage of the ratio of the black regions in the cBN sintered body in the image is shown as volume % in the column "cBN content" in each of Table 1 to Table 3.

<Method for Measuring Recess Coefficient>

The cBN sintered body tool obtained as above in each of the examples and the comparative examples was polished to expose the cross sectional surface thereof perpendicular to the joining surface having the largest area in the joining surfaces between the cBN sintered body and the joining layer. Then, the cross sectional surface was subjected to mirror-surface treatment by etching it using an Ar beam and then polishing it. Then, in the treated surface, a portion at which the cBN sintered body and the joining layer made contact with each other was observed using an SEM having a magnification of ×20000 while changing fields of view. Accordingly, a portion at which two adjacent cBN particles could be observed was specified as in the field of view of FIG. 1(b). Then, one of the two cBN particles was regarded as first cBN particle 7 and the other was regarded as second cBN particle 8.

Next, as shown in FIG. 1(b), it was assumed that point A represented an intersection close to second cBN particle 8 among intersections at which first cBN particle 7, joining layer 3, and binder phase 6 were in contact with one another. It was assumed that point B represented an intersection close to point A among intersections at which second cBN particle 8, joining layer 3, and binder phase 6 were in contact with one another. It was assumed that point C represented a point away from point A, along a boundary line on which first cBN particle 7 and joining layer 3 were in contact with each other, by ¼ of the length of a line segment connecting point A and point B to each other. It was assumed that point D represented a point away from point B, along a boundary line on which second cBN particle 7 and joining layer 3 were in contact with each other, by ¼ of the length of the line segment connecting point A and point B to each other. Next, the recess coefficient was calculated by dividing, by the length of the line segment connecting point A and point B to each other, an area of a region surrounded by a line segment connecting point C and point D to each other, first cBN particle 7, second cBN particle 8, and binder phase 6.

Using the same method as above, two adjacent cBN particles were observed in each of 30 locations and an average value of respective recess coefficients calculated therefrom is shown in the column "Recess Coefficient" in each of Table 1 to Table 3.

<Test of Measuring Joining Strength>

In each of the cBN sintered body tools obtained as above in the examples and the comparative examples, joining strength of the cBN sintered body for the tool base material was calculated. FIG. 4(a) is a plan view schematically showing a manner of putting a punching rod when measuring the joining strength of the cBN sintered body. FIG. 4(b) is a side view showing it when observed from a side.

Figure 4:
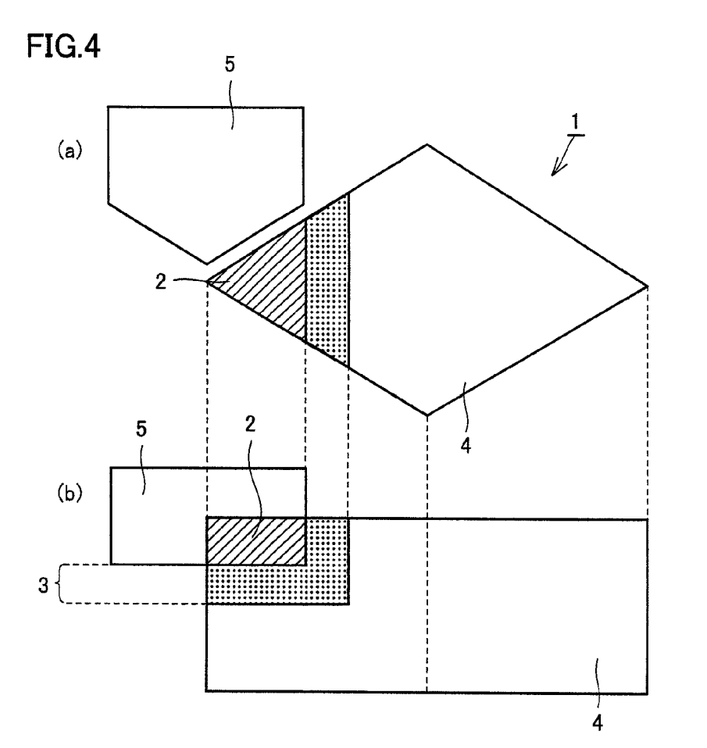
FIG. 4(a) is a plan view schematically showing a manner of putting a punching rod when measuring joining strength of a cBN sintered body.
FIG. 4(b) is a side view when viewing the state of FIG. 4(a) from a side.

In the cBN sintered body tool of each of the examples and the comparative examples, the joining strength of the cBN sintered body to the tool base material was measured using a method shown in FIG. 4. Specifically, a punching rod 5 made of cemented carbide was brought into surface contact with a side surface of cBN sintered body 2 so as to only impose load on cBN sintered body 2 and impose no load on tool base material 4. Then, with tool base material 4 being fixed so as not to move, the load imposed on punching rod 5 was gradually increased in order to measure a load with which cBN sintered body 2 was fractured from tool base material 4. The load causing the fracture was divided by the joining area between cBN sintered body 2 and tool base material 4, so as to calculate joining strength (kgf) per unit area ($mm^2$). The measurement for joining strength was performed for 20 samples in a similar manner. An average value thereof is shown in Table 4 and Table 5.

TABLE 4

|  |  | Joining Strength($kgf/mm^2$) |
|---|---|---|
| Examples | 1 | 42.4 |
|  | 2 | 42.9 |
|  | 3 | 43.5 |
|  | 4 | 43.7 |
|  | 5 | 43.9 |
|  | 6 | 43.3 |
|  | 7 | 43.1 |
|  | 8 | 42.5 |
|  | 9 | 43.3 |
| Comparative Examples | 1 | 35.8 |
|  | 2 | 36.4 |
|  | 3 | 37.5 |
|  | 4 | 36.7 |
|  | 5 | 35.8 |
|  | 6 | 33.9 |
|  | 7 | 34.9 |

TABLE 5

| Examples | 10 | 45.6 |
|---|---|---|
|  | 11 | 45.4 |
|  | 12 | 45.2 |
|  | 13 | 42.3 |
|  | 14 | 42.4 |
|  | 15 | 41.9 |
|  | 16 | 41.8 |
|  | 17 | 38.1 |
|  | 18 | 37.7 |
|  | 19 | 43.5 |
|  | 20 | 39.6 |
|  | 21 | 39.8 |
|  | 22 | 43.6 |
|  | 23 | 43.8 |

TABLE 5-continued

| | |
|---|---|
| 24 | 43.8 |
| 25 | 42.4 |
| 26 | 43.9 |
| 27 | 44.1 |
| 28 | 44.2 |
| 29 | 43.4 |
| 30 | 39.5 |
| 31 | 43.7 |
| 32 | 44.6 |
| 33 | 44.4 |
| 34 | 44.5 |
| 35 | 40.2 |
| 36 | 43.2 |
| 37 | 43.8 |
| 38 | 44.0 |

From Table 4 and Table 5, it is understood that the cubic boron nitride sintered body tool of each of the examples was significantly improved in joining strength between the cBN sintered body and the joining layer, as compared with the cubic boron nitride sintered body tool of each of the comparative examples. In other words, it was confirmed that with the main feature of the cubic boron nitride sintered body tool of the present invention, i.e., with the above-described recess coefficient, the cBN sintered body is less likely to fall from the tool base material. Accordingly, the cBN sintered body tool of the present invention, in which the cBN sintered body is firmly and highly rigidly joined to the tool base material, is apparently capable of enduring severe conditions.

Heretofore, the embodiments and examples of the present invention have been illustrated, but it has been initially expected to appropriately combine configurations of the embodiments and examples.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST

1: cubic boron nitride sintered body tool; 2: cubic boron nitride sintered body; 3: joining layer; 4: tool base material; 5: punching rod; 6: binder phase; 7: first cubic boron nitride particle; 8: second cubic boron nitride particle.

The invention claimed is:

1. A cubic boron nitride sintered body tool in which a cubic boron nitride sintered body is joined to a tool base material via a joining layer, wherein
   said cubic boron nitride sintered body contains cubic boron nitride particles by not less than 30 volume % and not more than 95 volume % and a binder phase by not less than 5 volume % and not more than 70 volume %,
   said binder phase is composed of at least one first compound and at least one Al compound, or is composed of at least one second compound,
   said first compound is a compound composed of at least one element belonging to one of a group IVa element, a group Va element, and a group VIa element in a periodic table, and at least one element selected from a group consisting of nitrogen, carbon, boron, and oxygen, or is a solid solution of said compound,
   said second compound is a compound selected from a group consisting of a Co compound, an Al compound, and a W compound, or is a solid solution of said compound,
   said joining layer contains Ti by 5 mass % or greater and Zr by 5 mass % or greater relative to a whole of said joining layer with a remainder thereof containing Cu while a total of said Ti and said Zr is 90 mass % or smaller, or said joining layer contains Ti by 1 mass % or greater and Cu by 15 mass % or greater with a remainder thereof containing Ag, and
   assuming that, in at least one cross sectional surface of said cubic boron nitride sintered body tool taken along a plane perpendicular to a joining surface having a largest area in joining surfaces between said cubic boron nitride sintered body and said joining layer, any adjacent two of said cubic boron nitride particles along the joining surface between said cubic boron nitride sintered body and said joining layer are a first cubic boron nitride particle and a second cubic boron nitride particle,
   assuming that a point A represents an intersection close to said second cubic boron nitride particle among intersections at which said first cubic boron nitride particle, said joining layer, and said binder phase are in contact with one another, and a point B represents an intersection close to said point A among intersections at which said second cubic boron nitride particle, said joining layer, and said binder phase are in contact with one another,
   assuming that a point C represents a point away from said point A, along a boundary line on which said first cubic boron nitride particle and said joining layer are in contact with each other, by ¼ of a length of a line segment connecting said point A and said point B to each other, and
   assuming that a point D represents a point away from said point B, along a boundary line on which said second cubic boron nitride particle and said joining layer are in contact with each other, by ¼ of the length of the line segment connecting said point A and said point B to each other,
   a value obtained when an area of a region surrounded by a line segment connecting said point C and said point D to each other, said first cubic boron nitride particle, said second cubic boron nitride particle, and said binder phase is divided by the length of the line segment connecting said point A and said point B to each other is not less than 0.14 µm and not more than 0.6 µm.

2. The cubic boron nitride sintered body tool according to claim 1, wherein said joining layer contains Ni by 5 mass % or greater.

3. The cubic boron nitride sintered body tool according to claim 1, wherein said joining layer contains Ni by 15 mass % or greater.

4. The cubic boron nitride sintered body tool according to claim 1, wherein said cubic boron nitride sintered body contains the cubic boron nitride particles by not less than 65 volume % and not more than 95 volume %.

5. The cubic boron nitride sintered body tool according to claim 1, wherein said binder phase further contains one or both of W by not less than 0.1 mass % and not more than 5 mass % and Si by 2 mass % or smaller.

6. The cubic boron nitride sintered body tool according to claim 1, wherein said cubic boron nitride particles contains Mg by not less than 0.03 mass % and not more than 1 mass % and Li by not less than 0.05 mass % and not more than 0.5 mass %.

* * * * *